United States Patent
Ong et al.

(10) Patent No.: US 12,050,856 B2
(45) Date of Patent: Jul. 30, 2024

(54) METHOD AND APPARATUS FOR CREATING A CURATED LIST OF IMPORTANT OR ACTIONABLE ITEMS FROM RECEIVED, DIGITIZED HANDWRITTEN SYMBOLS AND TEXT

(71) Applicant: Dell Products, LP, Round Rock, TX (US)

(72) Inventors: Chin Leong Ong, Singapore (SG); Benedict Tiong Chee Tay, Singapore (SG); Pui San Carrie Ho, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 9 days.

(21) Appl. No.: 17/874,256

(22) Filed: Jul. 26, 2022

(65) Prior Publication Data
US 2024/0037323 A1    Feb. 1, 2024

(51) Int. Cl.
*G06F 40/171* (2020.01)
*G06F 40/166* (2020.01)

(52) U.S. Cl.
CPC .......... *G06F 40/166* (2020.01); *G06F 40/171* (2020.01)

(58) Field of Classification Search
None
See application file for complete search history.

(56) References Cited

U.S. PATENT DOCUMENTS

| | | | |
|---|---|---|---|
| 10,387,034 B2 * | 8/2019 | Lee | G06V 30/32 |
| 10,552,013 B2 * | 2/2020 | Van Os | G06F 3/04842 |
| 11,361,153 B1 * | 6/2022 | García Salvadores | G06F 3/03545 |
| 2017/0068436 A1 * | 3/2017 | Auer | G06F 3/04883 |
| 2022/0300734 A1 * | 9/2022 | Smolyanskaya | G06F 40/117 |

OTHER PUBLICATIONS

Lieberman et al., "Out of context: Computer systems that adapt to, and learn from, context" IBM Systems Journal, vol. 39, Issue 3.4, published 2000, pp. 617-632. (Year: 2000).*

* cited by examiner

*Primary Examiner* — Amelia L Tapp
(74) *Attorney, Agent, or Firm* — Prol Intellectual Property Law, PLLC; H. Kenneth Prol

(57) ABSTRACT

A notetaking information handling system device comprising a processor, a memory device, and a touchscreen display device displaying a graphical user interface (GUI) of a software application for accepting digitized handwritten notes and receiving a digitized handwritten note in a first notetaking instance. The processor to record metadata relating to the first notetaking instance and execute code instructions of a notes auto-curating system to recognize and parse the digitized handwritten note and determine from the digitized handwritten note a smart symbol or a keyword within the note content of the digitized handwritten note. The notes auto-curating system to process digitized handwritten note with a trained machine learning system to correlate the digitized handwritten note with an important notes category or an action items category, and to generate a corresponding to-do list or important notes list with the digitized handwritten note with additional similarly-categorized digitized handwritten notes received.

20 Claims, 5 Drawing Sheets

METHOD AND APPARATUS FOR CREATING A CURATED LIST OF IMPORTANT OR ACTIONABLE ITEMS FROM RECEIVED, DIGITIZED HANDWRITTEN SYMBOLS AND TEXT

FIELD OF THE DISCLOSURE

The present disclosure generally relates to digitization of handwritten notes on a touchscreen information handling system. The present disclosure more specifically relates to detecting and recognizing handwritten symbols and text from digitization of handwritten notes at a notetaking information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include a digital touchscreen or be operatively coupled to a separate or auxiliary notetaking information handling system used to conduct notetaking on digital content via a touchscreen display and, often, a stylus or other input/output (I/O) device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
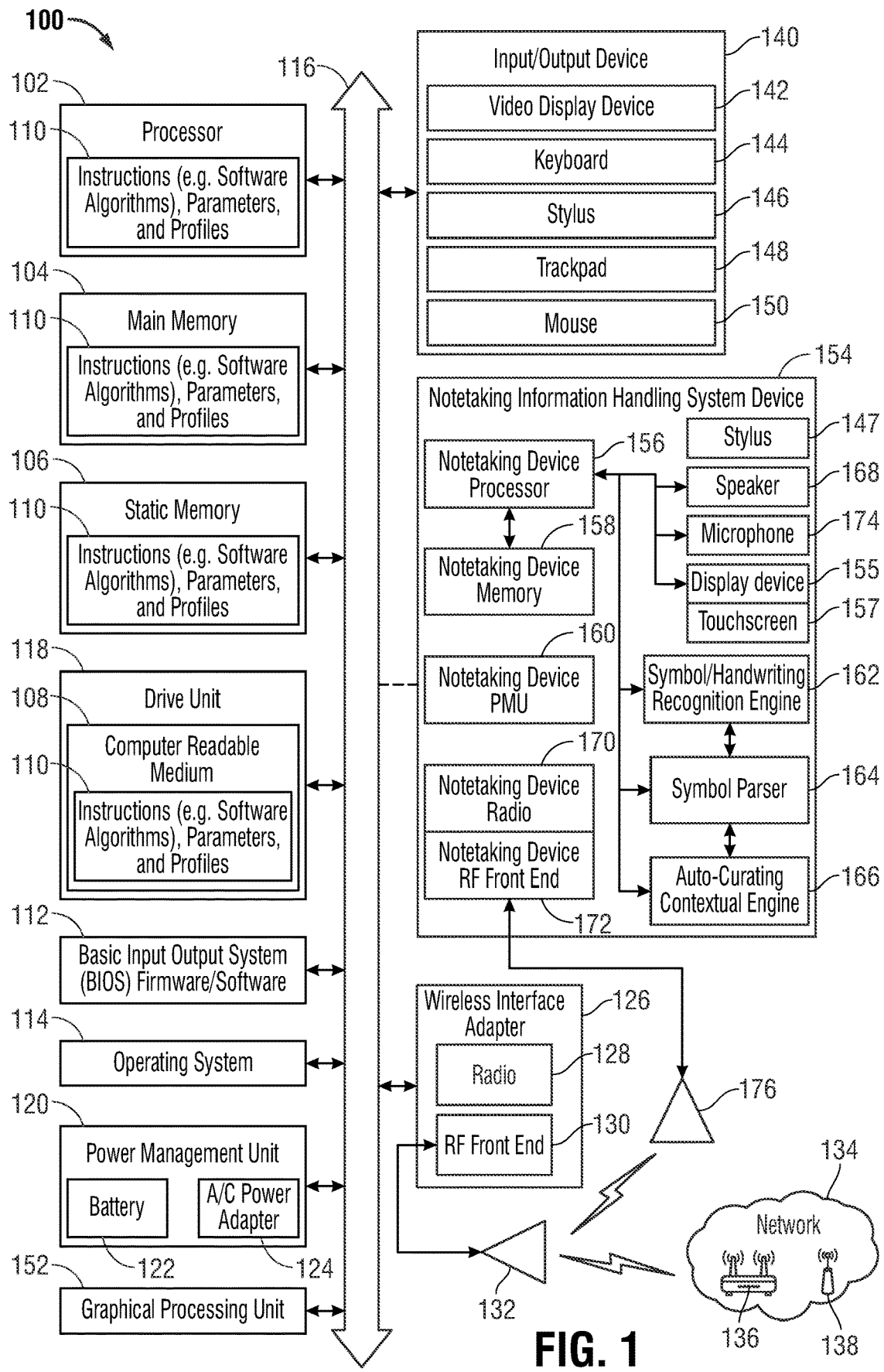
FIG. 1 is a block diagram of an information handling system with a notetaking information handling system device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems may include those devices, often laptop-type information handling systems or notetaking tablet-type information handling system devices, some of which may be thin and light systems with touchscreen display capability for analog notetaking inputs from a user. The notetaking information handling system devices may include less processing, storage, software, firmware, or other resources than other laptop-type information handling systems in some embodiments but may be thin and light and may operably couple with and augment the other host information handling systems as an extra display screen or for mobile display functions such as notetaking. Information handling systems, including notetaking tablet-type information handling system devices, may be operatively coupled to other devices that provide additional levels of resources such as additional peripheral devices. In an example embodiment, these other devices include input/output (I/O) devices such as a stylus, touchscreen, touchpad, mouse, camera, or other I/O devices.

The notetaking information handling system devices may include, for example, additional processing resources and display resources used by the laptop type information handling system to assist in executing computer usable program code such as notetaking software, word processing software, calendaring software, and the like. Additionally, the notetaking information handling system devices may include a touchscreen display and may operate as a standalone device that may seamlessly be operatively coupled and uncoupled from a host information handling system in various embodiments. The notetaking information handling system devices and host information handlings system may be operatively coupled via either a wired or wireless connection using a notetaking device radio or wired connection port.

Current notetaking application experience on information handlings systems may be poor because they fail to provide users an intuitive, user-friendly solution to capture the user's intent with the received notes relating to recording important points or action items for various events such as during a meeting. Sometimes notetaking events also involve content presented via the information handling system. The embodiments of the present disclosure disclose operating a notes auto-curating system on a notetaking information handling system device to auto-curate a list of actionable items. Often with notes digitized via current note-taking applications are recorded and even may be translated into digital text. However, the current systems and even paper note taking still have an inherent problem of notes not being not easily retrieved and tracked, especially from among a plurality of varied notes, from pages of content with notes, or from among a plurality of note taking sessions and documents as entered by a user. Some handwritten notes may include a user's intent for the notes including designation of important points, actionable items, or other intended designations for the notes. These intent indicators may be missed, and this may make the handwritten notes easily overlooked among pages of notes including within note content and mixed with other content or among plural notetaking sessions. Existing notetaking applications with digitization capabilities for notes may blend important points, action items, or other intentions of notes of events or in the notes into a catalogue of note instances and mixed with the general note content of what may be a plethora of handwritten notes. Thus, separation and tracking of one or aspects highlighted in the notes by a user as to the intent of the notes is difficult from ordinary notes taken manual review of the digitized notes. For example, easy tracking and navigation to intent-categories of the user among handwritten notes would be beneficial to ease of use of a notetaking application.

The notes auto-curating system of the present disclosure is a user-friendly system that may utilize machine learning and crowd sourced information to capture a user's intent about their action items, important notes or other intent-classification from handwritten notes and symbols recorded in various note taking instances on a notetaking information handling system device according to embodiments herein. Utilization of symbol and handwriting recognition as well as symbol parsing enables an auto-curating contextual engine to use symbols, such as detected smart symbols, keywords, assigned metadata context for note entry instances, and note content context words as input to a trained machine learning classifier to categorize various digitized handwritten notes as actionable items, important notes, or as some other intent-classification in various embodiments. Then the notes auto-curating system may generate auto-curated lists from the classified, digitized handwritten notes for presentation in one place and for easy retrieval and tracking. Further, date stamping and other identification data for note taking instances allows searchability and separation as well as tracking of the auto-curated, digitized handwritten notes. In this way, a user may utilize the notes auto-curating system to easily navigate and retrieve digitized handwritten notes having a determined intent for important points, a to-do list such as an action items list, or some other user's intent classification. The classified, digitized handwritten notes are distinct from other general notes content among what may be a large plurality of note taking instances. Such a streamlined navigation and tracking of intent-classified digitized handwritten notes may improve a digital note taking experience for users according to embodiments herein.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, a notetaking tablet-type information handling system device, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any other network devices such as a notetaking information handling system device 154 according to various embodiments herein. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (110) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein.

In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. In a particular embodiment, the notetaking information handling system device 154 may serve as an additional video display device via it's video display device 155 and including a touchscreen system 157 according to embodiments herein. In an embodiment, the notetaking information handling system device 154 may serve as a peripheral device to the information handling system device 100 when operatively coupled, or the notetaking information handling system device 154 may operate as a standalone device an execute one or more applications including a notes auto-curating system including the symbol/handwriting recognition engine 162, the symbols parser 164, and the auto-curating contextual engine 166 of the present embodiments herein. Additionally, the information handling system 100 may include one or more input/output devices 140 including an alpha numeric input device such as a keyboard 144 and/or a cursor control device, such as a mouse 150, touchpad/trackpad 148, a stylus 146, a speaker or microphone that provides audio input/output. Further, the notetaking information handling system device 154 may include one or more input/output devices including display device 155 with a touchscreen 157, an alpha numeric input device (not shown) such as a virtual keyboard and/or a cursor control device (not shown), such as a mouse, touchpad/trackpad, a stylus 147, a speaker 168 or microphone 174 that provides audio input/output.

In an embodiment, the video display device 142 or the notetaking information handling system device video display 155 may provide output to a user that includes, for example, one or more windows describing one or more instances of applications being executed by the processor 102 of the information handling system. In this example embodiment, a window may be presented to the user that provides a graphical user interface (GUI) representing the execution of that application and its content and may include a note taking application or may allow for notetaking on content of another executing software application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to a notetaking information handling system device 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. In an embodiment, the radio 128 may be used to operatively couple the information handling system 100 to the video display device 142 wirelessly. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset, a wireless stylus 146, and a wireless trackpad 148, among other wireless peripheral devices used as input/output (I/O) devices 140. In an alternative embodiment, a notetaking information handling system device radio 170 and notetaking information handling system device RF front end 172 may be used to operatively couple, wired or wirelessly via an antenna 176, each of these peripheral devices (input/output devices 140) to the information handling system 100. In various embodiments, the notetaking information handling system device 154 may be wirelessly coupled to the information handling system 100 via antenna 132 or, optionally, via a wired coupling as represented by the dotted line.

The wireless interface adapter 126 or notetaking device radio 170 may include any number of antennas 132 or 176 which may include any number of tunable antennas for use with the system and methods disclosed herein. Although FIG. 1 shows a single antenna 132 or 176 in various embodiments, the present specification contemplates that the number of antennas 132 or 176 may include more or less of the number of individual antennas shown in FIG. 1. Additional antenna system modification circuitry (not shown) may also be included with the wireless interface adapter 126 or notetaking device front end 172 to implement coexistence control measures via an antenna controller in various embodiments of the present disclosure.

In some aspects of the present disclosure, the wireless interface adapter 126 or notetaking device radio 170 may operate two or more wireless links. In an embodiment, the wireless interface adapter 126 or notetaking device radio 170 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 or notetaking device radio 170 may operate the two or more wireless links with a single, shared communication frequency band such as with the 5G or WiFi WLAN standards relating to unlicensed wireless spectrum for small cell operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 or 176 may be capable of operating at a variety of frequency bands. Other communication frequency bands, channels, and transception arrangements are contemplated for use with the embodiments of the present disclosure as well and the present specification contemplates the use of a variety of communication frequency bands.

The wireless interface adapter 126 or notetaking device radio 170 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 or notetaking device radio 170 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100 or the notetaking information handling system device 154. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

The wireless interface adapter 126 or notetaking device radio 170 can represent an add-in card, wireless network interface module that is integrated with a main board of the information handling system 100, the notetaking information handling system device 154, integrated with another wireless network interface capability, or any combination thereof. In an embodiment the wireless interface adapter 126 or notetaking device radio 170 may include one or more radio frequency subsystems including transmitters and wireless controllers for connecting via a multitude of wireless links. In an example embodiment, an information handling system 100 or notetaking information handling system device 154 may have an antenna system transmitter for Bluetooth®, BLE, 5G small cell WWAN, or Wi-Fi WLAN connectivity and one or more additional antenna system transmitters for communication including with the notetaking information handling system device 154 described herein. The RF subsystems and radios 128 or notetaking device radio 170 and include wireless controllers to manage authentication, connectivity, communications, power levels for transmission, buffering, error correction, baseband processing, and other functions.

As described herein, the host information handling system 100 may be operatively coupled to the notetaking information handling system device 154. The notetaking information handling system device 154 in the present disclosure may be any device that is operatively coupled to the host information handling system 100 either via a wired or wireless connection. When connected to the information handling system 100 via a wired connection as represented by the dotted line, the information handling system 100 may provide power, processing, data storage, communication, and software resources to the notetaking information handling system device 154. In an example embodiment, the notetaking information handling system device 154 may execute computer software program code via a notetaking information handling system device processor 156 as well as coordinating execution with a processor 102 of the host information handling system 100 in some embodiments. The notetaking information handling system device 154 may execute computer software program code for one or more applications including the notes auto-curating system of the present embodiments herein including the symbol/handwriting recognition engine 162, the symbols parser 164, and the auto-curating contextual engine 166, among others. When operatively coupled to the host information handling system 100 wirelessly, the notetaking information handling system device 154 may utilize processing resources, software resources, data storage resources, and other resources of the host information handling system 100. However, notetaking information handling system device 154 may be used independently from the information handling system 100 as a thin client information handling system.

The notetaking information handling system device 154 includes a notetaking information handling system device processor 156 used to execute computer readable program code maintained on the notetaking information handling system device memory device 158. This computer readable program code may be executed by the notetaking information handling system device processor 156 to perform the functions of the notetaking information handling system device 154 and the notes auto-curating system including the symbol/handwriting recognition engine 162, the symbols parser 164, and the auto-curating contextual engine 166 described herein. For example, the notetaking information handling system device 154 may perform symbol and handwriting recognition and symbol parsing on received handwritten notes, and access trained machine learning resources of a notes auto-curating system. The auto-curating contextual engine 166 may use detected smart symbols, keywords, metadata contextual information for note entry instances, and detected note content context words into a trained machine learning classifier to categorize various digitized handwritten notes as actionable items, important notes, or other intent-categorized classifications. Then the notes auto-curating system may auto-curate the digitized handwritten notes for presentation in one place and for easy retrieval and tracking. Further, date stamping and other identification data for notetaking instances allows searchability and separation as well as tracking of the auto-curated digitized handwritten notes. In this way, a user may utilize the notes auto-curating system to easily navigate and retrieve digitized handwritten notes having a determined intent classifications for important points, a to-do list such as an action items list, or other intent classifications according to embodiments herein. These intent-classified digitized handwritten notes are distinguished and accessible relative to other, ordinary digitized handwritten notes with content blended among a plurality of note taking instances or other content. The notes auto-curating system improves a digital note taking experience for users according to embodiments herein In an embodiment, the notetaking information handling system device 154 includes a notetaking information handling system device power management unit (PMU) 160. The notetaking information handling system device PMU 160 may manage the power provided to the components of the notetaking information handling system device radio 170 such as the notetaking information handling system device processor 156, any cooling system, and power to any input/output devices operatively coupled to the notetaking information handling system device 154 such as the stylus 147 or other components that may require power when the notetaking information handling system device 154 is operating standalone from the information handling system 100. In other embodiments, the notetaking information handling system device PMU 160 may monitor power levels and be electrically coupled, either wired or wirelessly, to the information handling system 100 to provide power or the notetaking information handling system device PMU 160 may regulate power from a power source such as a battery.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
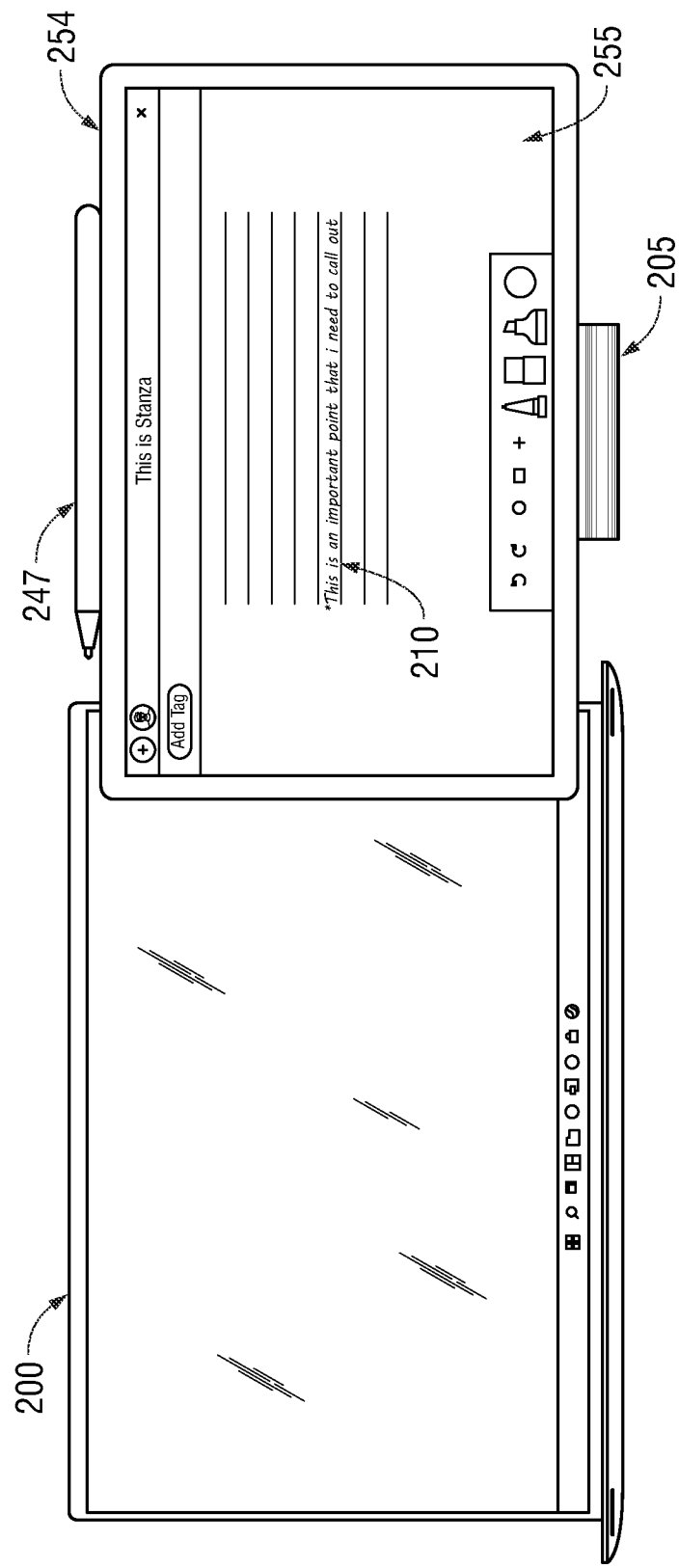
FIG. 2 is a graphic diagram of a notetaking tablet-type information handling system device according to an embodiment of the present disclosure.

FIG. 2 is a graphic diagram of a notetaking information handling system device 254 according to an embodiment of the present disclosure. FIG. 2 shows a notetaking tablet-type information handling system device 254 which may be operatively coupled to a host information handling system 200, such as a laptop-type information handling system. Laptop host information handling system 200 could also be a notetaking information handling system in some embodiments as well. One example embodiment of the notetaking tablet-type information handling system device 254 may be the Dell® Stanza device. The operative coupling may be wireless or wired in various embodiments. The notetaking tablet-type information handling system device 254 may be relatively small so that a user may carry it, along with an information handling system, to remote locations so that it may be used as described herein.

In an embodiment, the notetaking tablet-type information handling system device 254 may be used as an auxiliary display screen and may have a stand 205 to permits the user to use the notetaking tablet-type information handling system device 254 alongside the information handling system 200 while providing additional functionality in support of information handling system 200. In addition to providing an auxiliary display screen, the notetaking tablet-type information handling system device 254 may be used, in various situations, to record notetaking instances by a user writing digitized handwritten notes 210 on the touchscreen display screen 255. The notetaking tablet-type information handling system device 254 can operate as a handheld tablet device allowing a user to write on touchscreen display 255 with a stylus 247 or other I/O device. As described herein, the notetaking tablet-type information handling system device 254 executes a notetaking application presented on the touchscreen display 255 as shown and which may accept digitized handwritten notes 210 that are written on the touchscreen display 255 in embodiments herein. The digitized handwritten notes may be digitized as an image of the handwritten notes in an aspect. Further, these digitized handwritten notes 210 may be input into the notes auto-curating system including the symbol/handwriting recognition engine, the symbols parser, and the auto-curating contextual engine executing via the notetaking device processor as described herein.

For example, the notetaking tablet-type information handling system device 254 may perform symbol and handwriting recognition and symbol parsing on received handwritten notes in a notes auto-curating system in an embodiment. The parsed, digitized handwritten notes 210 may then be input into an auto-curating context engine which may access machine learning classifier and input smart symbols and keywords detected with a dictionary database, assigned metadata for notetaking instances, and detected note content context keywords. With these and other context inputs, the auto-curating context engine may use a previously trained machine learning classifier to categorize various digitized handwritten notes 210 into user intent-categorizations including an actionable items category, an important notes category and other user intent-categorization classifications. Then the notes auto-curating system may generate an auto-curated list of a subset of digitized handwritten notes 210 for presentation in one place and for easy retrieval and tracking.

In one example embodiment, digitized handwritten note 210 may include note content including a written phrase as shown in the example notetaking instance. In such an embodiment, a notetaking instance may also include one or more smart symbols, such as the asterisk as shown in FIG. 2. Other smart symbols may include an exclamation point, a check, checkbox, box, hyphen, a mathematical symbol, a punctuation symbol, a dash, arrow, circle, oval, triangle, or other handwritten symbol near a notetaking instance that may be parsed separately from the notetaking instance note content to determine if it is a smart symbol. Additionally, a handwritten notetaking instance may include one or more handwritten keywords such as "important," "priority," "hot," "urgent," "immediately," "now," "today," "to-do," "action" or others that may be detected as handwritten as part of note content or nearby a digitized handwritten note 210.

The handwritten note 210 may be scanned for handwriting recognition and then parsed for delimiters of the handwritten note 210 as well for symbols and characters such as smart symbols. An auto-curating contextual engine may also scan the notes content for keywords, dates, names, various symbols, or other important points in an embodiment. The notes auto-curating system of the present embodiment may access a keyword dictionary or one or more symbols databases that include artificial intelligence text recognition software in some embodiments, to determine common smart symbols and keywords that correspond to an intent or meaning of importance for handwritten notes. With this information, the auto-curating contextual engine use a trained machine learning classifier to assign a digitized handwritten note 210 in a notetaking instance to be part of a user intent-categorization such as action items for a to-do list, important notes categorization or some other user intent-categorization. The note taking application, or the notes auto-curating system of the present embodiment determines may record various types of metadata to the digitized handwritten notes 210 that corresponds to date, time, meeting status, named event, participants, calendar entry, or status of the notetaking instance and associate the same with digitized handwritten note 210 according to embodiments herein. According to embodiments herein, the notes auto-curating system may then determine if a handwritten note 210 should be curated into an important notes list, an action items list, or other curated lists as described. Other curated lists may include other user intent-categorized curated lists such as background information list, biographical information list, bibliographic information list, contextual topic-related lists, intent-category lists related to identified persons or meeting attendees lists, or others. The notes auto-curating system of the present embodiment may use determined smart symbols and keywords as well as metadata and context words in note content as input in the auto-curating contextual engine for a trained machine learning classifier to determine a user's intent for a digitized handwritten note 210. With this intent categorization, the notes auto-curating system of the present embodiment then provides for an easily managed and tracked curated list or lists relating to important notes, a to-do list, or other intent categories. These intent categorizations may be based on scanned note content and associated metadata context according to embodiments herein. Scanned and parsed note content for digitized handwritten note may include determined actions, importance, topical information, date and time, names, titles, or other context-based inputs from smart symbols, keywords, or other aspects of the note content to generate a curated list reflecting intent of the user's notetaking instance according to various embodiments herein.

Figure 3:
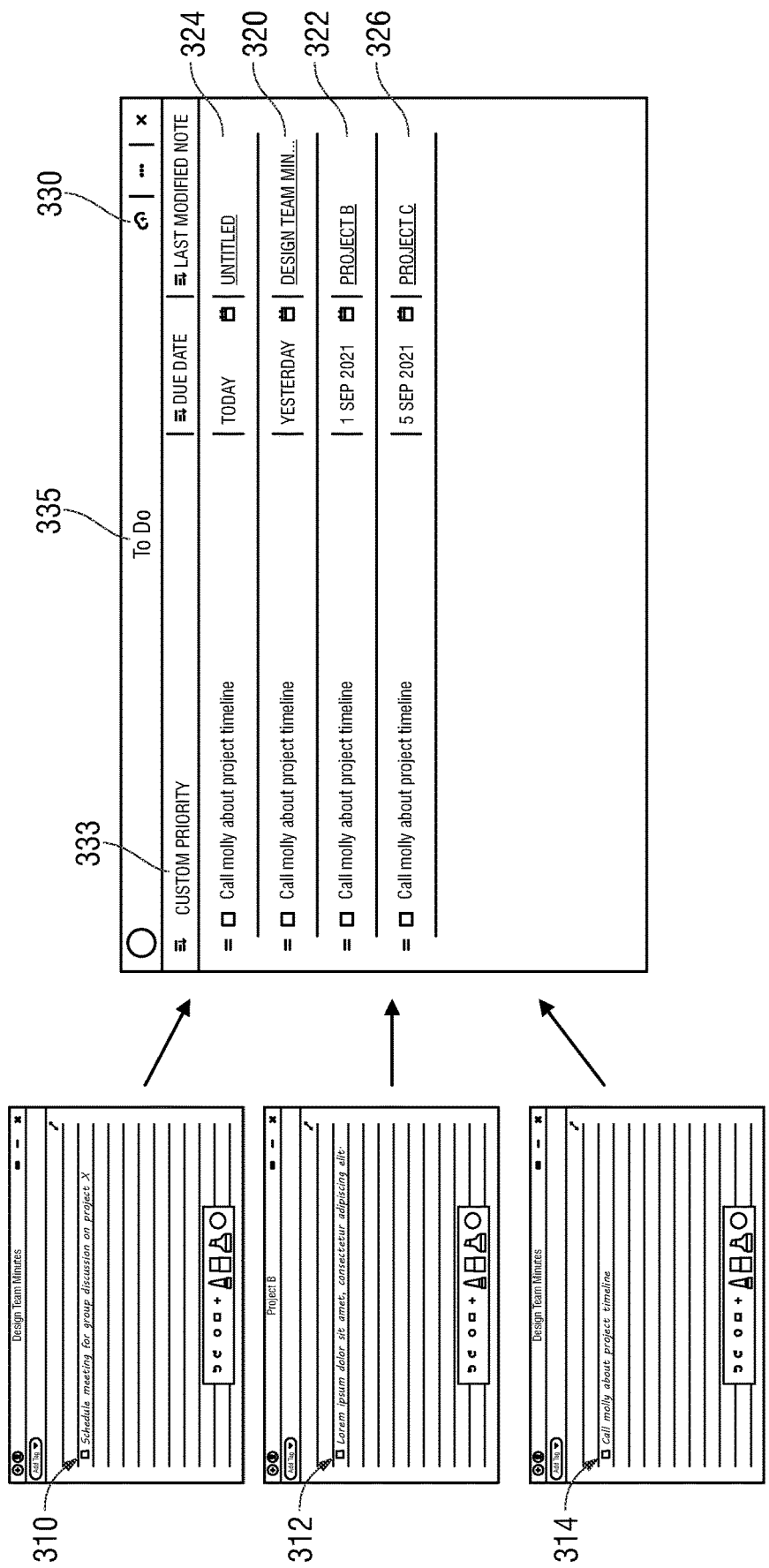
FIG. 3 is a graphic diagram of a graphical user interface (GUI) displaying an example of operation of a notes auto-curating system to determine from symbol recognition and parsing an automatically curated list of actionable items displayed on a notetaking information handling system device according to an embodiment of the present disclosure.

FIG. 3 is a graphic diagram of a plurality of digitized handwritten notes for a plurality of notetaking instances and a curated list graphic user interface (GUI) depicting a curated list generated from the plurality of digitized handwritten notes according to an embodiment of the present disclosure. FIG. 3 shows a first digitized handwritten note 310 in a GUI for a notetaking application in a first notetaking instance according to an example embodiment. The first digitized handwritten note 310 reads "Schedule meeting for group discussion on project X" and preceded by a symbol that is a box, or unchecked checkbox in one embodiment. The first notetaking instance is titled "Design Team Minutes" in the notetaking application which may be recorded in metadata in an embodiment. Further, the first notetaking instance depicted may have received the first digitized handwritten note 310 at a time or date recorded in further metadata associated with the digitized handwritten note and for the first notetaking instance in an embodiment. Additional metadata may be recorded including linking with a currently ongoing scheduled meeting as discerned from a calendaring application for a meeting title, priority designation, attendees list, description, or other relevant contextual data. Further, the notes auto-curating system may link the first notetaking instance and digitized handwritten note 310 with context of presentation software executing on a notetaking information handling system or by operatively coupled host information handling system for presentation of materials during the first notetaking instance to determine materials titles or other contextual information of presented materials in metadata.

A second digitized handwritten note 312 in a GUI for a notetaking application for a second notetaking instance according to an example embodiment which shows an example of note content also preceded by a symbol that is a box, or unchecked checkbox. As with the first digitized handwritten note 310, the second notetaking instance for the second digitized handwritten note 312 is titled "Project B" in the notetaking application which may be recorded in metadata in an embodiment. Further, the second notetaking instance depicted may have received the second digitized handwritten note 312 at a time or date recorded in further metadata associated with the second digitized handwritten note and second notetaking instance in an embodiment. Additional metadata may be recorded including linking with a currently ongoing scheduled meeting as discerned from a calendaring application or with context of presentation software executing on a notetaking information handling system or by an operatively coupled host information handling system during the second notetaking instance for further contextual information in metadata in embodiments herein.

A third digitized handwritten note 314 in a GUI for a notetaking application for a third notetaking instance according to an example embodiment which shows an example of note content. The third digitized handwritten note 314 reads "Call molly about project timeline" and is also preceded by a symbol that is a box, or unchecked checkbox. Unlike the other digitized handwritten notes 310 and 312, the third notetaking instance for the third digitized handwritten note 314 is untitled in the notetaking application in an embodiment. However, the third notetaking instance depicted may have received the third digitized handwritten note 314 at a time or date recorded in metadata associated with the third digitized handwritten note and third notetaking instance in an embodiment. Additional metadata may be recorded including linking with a currently ongoing scheduled meeting as discerned from a calendaring application or with context of presentation software executing on a notetaking information handling system or by an operatively coupled host information handling system for further contextual information in metadata for the third notetaking instance in embodiments herein.

According to embodiments described herein, the notes auto-curating system of the present embodiment may use handwriting and symbol recognition as well as symbol parsing to parse each of the digitized handwritten notes 310, 312 and 314 received in the first, second and third notetaking instances, respectively. The notes auto-curating system may then parse the note content of each of the digitized handwritten notes 310, 312 and 314 to identify and pair symbols with smart symbols (for example, the unchecked checkbox), determine keyword, determine contextual words (for example, "project X" and "molly"), and determine a type of sentence or phrase of the note content such as verbs identifying action sentences or phrases in various embodiments.

The notes auto-curating system may implement an auto-curating contextual engine to use determined smart symbols and keywords, recorded metadata for the digitized handwritten notes 310, 312 and 314, and additional contextual data from the parsing of the digitized handwritten notes 310, 312 and 314 to determine, via a trained machine learning classifier, a user's intent categorization or classification for each of the received digitized handwritten notes 310, 312, and 314 according to embodiments of the present disclosure. In the embodiments, the notes auto-curating system implements the auto-curating contextual engine to determine intent categorizations using these factors as inputs into the trained machine learning classifier. In the shown example embodiment, the unchecked checkbox may be a smart symbol which when paired with action sentence phrases parsed from the digitized handwritten notes 310, 312 and 314 may yield from the auto-curating contextual engine an action items intent categorization for each of the digitized handwritten notes 310, 312 and 314. Additional smart symbols may include a check or others described in embodiments herein. Further keyword phrases such as "to do" or "action items" or even action words such as "call" or "schedule" may be input into the auto-curating contextual engine to indicate an action items intent categorization for the digitized handwritten notes 310, 312 and 314. Further, contextual name words may be parsed from note content, such as "meeting," "discussion," "project X," or "molly" may further help indicate action items categorization. Similar input factors including different smart symbols such as *, !, =>, or keyword phrases or terms such as "urgent," "critical," or the like may be used with an important notes classification of digitized handwritten notes by the auto-curating contextual engine in other embodiments. In some embodiments, importance symbols may be used with action item categorized digitized handwritten notes while action words may be used with important notes categorized digitized handwritten notes, but the auto-curating context engine determines which intent classification applies to the digitized handwritten notes based on a wider array of inputs to the trained machine learning classifier including smart symbols and keywords in some example embodiments.

The notes auto-curating system implements the auto-curating contextual engine to determine intent categorizations for the digitized handwritten notes 310, 312 and 314 may store those digitized handwritten notes 310, 312 and 314 in a classification database which may maintain additional previously-stored and classified digitized handwritten notes of the same user intent-categorization in an embodiment. Then, the notes auto-curating system may generate a curated list of digitized handwritten notes 310, 312 and 314 and any other pertinent digitized handwritten notes stored in the classification database for presentation to the user in a curated list GUI 330. In the shown embodiment of FIG. 3, the curated list GUI 330 presents a curated to-do list 335. The curated to-do list has a plurality of curated digitized handwritten notes 320, 322, and 324 that correspond to the received digitized handwritten notes 310, 312 and 314 in an example embodiment. However, the curated to-do list 335 may present the digitized handwritten notes 320, 322 and 324 in any prioritization order including a default prioritization order. In the shown example embodiment, the digitized handwritten notes in the curated to-do list 335 are presented in order 324, 320 and 322 which, as can be seen in the column presenting date metadata for the digitized handwritten notes, is in a reverse chronological order. Further, in one embodiment metadata information may be presented with the digitized handwritten notes 320, 322 and 324 including a title entered by the user in the notetaking application during the first, second and third notetaking instances. In another embodiment, a previous action item that was a categorized digitized handwritten note 326 in the action items classification database is also included in the generated curated to-do list and also shown in reverse chronological order. Any prioritization may be used with the curated to-do list or with any other curated list presented via the curated list GUI 330. For example, the custom priority function 333 may be selected to assign any other prioritization or filtering of any curated list presented in a curated list GUI. For example, a user may use custom priority function 333 to set a date range, select a contextual search item such as "project X," "molly," "project B", "Design Team" or any combination, select chronological order, select from plurality of granular importance designation levels for digitized handwritten notes, or the like. The curated list GUI may also provide for a user to select from among curated to-do lists, curated important notes lists, or curated other categorized digitized handwritten notes lists according to various embodiments herein. With this, the notes auto-curating system provides a user with an efficient and intuitive way to navigate received digitized handwritten notes from among, what may be, a large number of digitized handwritten notes without needing to tediously review all notes or necessarily recall all pertinent searching terms up front.

Figure 4:
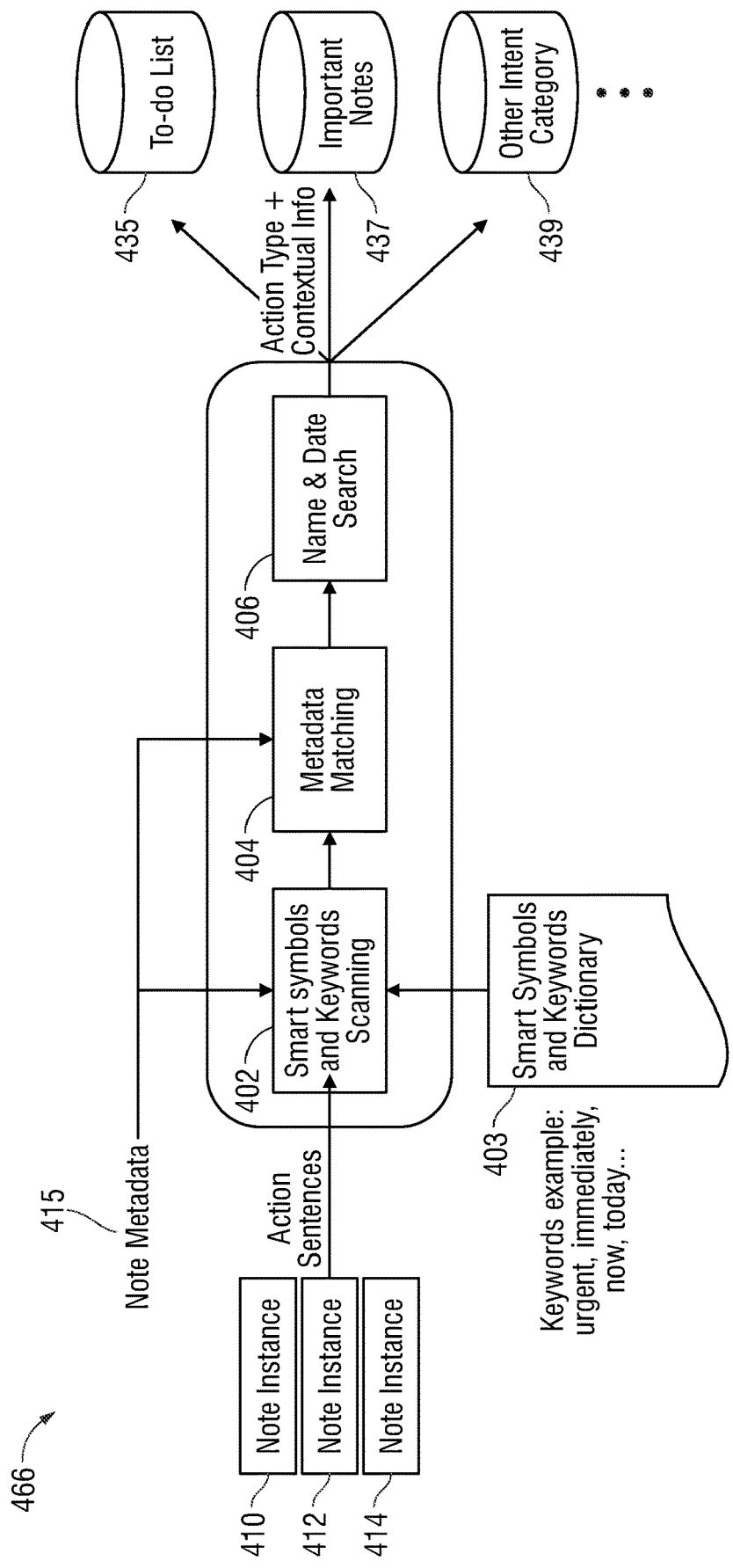
FIG. 4 is block diagram of an auto-curating contextual engine for a notes auto-curating system for determining an automatically curated list of digitized handwritten notes according to intent-categorizations in an embodiment of the present disclosure.

FIG. 4 is a graphic diagram of an auto-curating contextual engine for a notes auto-curating system executing one a notetaking information handling system according to an embodiment of the present disclosure. FIG. 4 shows a plurality of digitized handwritten notes 410, 412 and 414 having corresponding notetaking instances after recognition and parsing by the notes auto-curating system according to embodiment. The digitized handwritten notes 410, 412 and 414 with corresponding notetaking instances are input into the auto-curating contextual engine 466 along with corresponding recorded metadata 415 for the digitized handwritten notes 410, 412 and 414 according to an embodiment of the present disclosure.

The auto-curating contextual engine 466 may conduct smart symbols and keyword scanning 402 via a keywords library and smart symbols library 403 in one embodiment. This may also include terms found in metadata 415 associated with digitized handwritten notes 410, 412 and 414 in embodiments herein. The keywords or smart symbols detected may be input into a trained machine learning classifier for determination of intent categorization assignment to the digitized handwritten notes 410, 412 and 414. The auto-curating contextual engine 466 may also conduct metadata matching 404 for associating metadata received with the digitized handwritten notes 410, 412 and 414 having corresponding notetaking instances and providing this corresponding metadata, as described in various embodiments herein, into the trained machine learning classifier of the auto-curating contextual engine 466. Additionally, the auto-curating contextual engine 466 may also conduct name, date or other contextual word searching 406 on the notes content of the parsed digitized handwritten notes 410, 412 and 414. Additional contextual words may include verbs used in the parsed digitized handwritten notes 410, 412 and 414 indicating action items or no such verbs indicating merely notes in one example embodiment. The auto-curating contextual engine 466 also uses this name, date, or other contextual word data as input into the trained machine learning classifier of the auto-curating contextual engine 466 according to another embodiment.

An auto-curating contextual engine may be utilized to determine, with a trained machine learning classifier, from among any number of established intent-categories for a user's digitized handwritten note for a given notetaking instance in an embodiment. In example embodiments, a machine learning system may be trained and used by the auto-curating contextual engine, and which may be any known or future developed type of machine learning or neural network according to embodiments herein. In particular embodiments, the machine learning could be selected from bootstrap aggregating ("bagging"), Bayes optimal classifier, boosting meta-algorithm, Bayesian model averaging, Bayesian model combination, and stacking generalization, for example. The training of the machine learning system used includes utilizing parsed notes from crowdsourced digitized handwritten notes of users of notetaking applications as delivered to or stored at a central management system accessible by the auto-curating contextual engine in some embodiments. In this way, a large sample of smart symbols and keywords may be inserted into a machine learning classifier to train the auto-curating contextual engine to determine from smart symbols, keywords, or a combination, as well as other contextual data and metadata, categories of a user's intent during a notetaking instance.

In another embodiment, a user of a notetaking information handling system executing the notetaking application and the notes auto-curating system, may train the auto-curating contextual engine with smart symbols and keywords used by that user over time. In this way, a library of keywords or smart symbols may be generated for the auto-curating contextual engine to utilize to determine intent categorizations according to embodiments herein from parsed digitized handwritten notes input into the auto-curating contextual engine. In yet another embodiment, a user may custom input one or more smart symbols or keyword to further train the machine learning classifier and add to the smart symbols database or the keywords database 403 in some embodiments. The training of the machine learning classifier may occur at a central management system for management of the notetaking information handling system due to computational requirements, however once trained, a trained machine learning classifier may be executed at the notetaking information handling system in some embodiments.

The auto-curating contextual engine 466 inputs scanned smart symbols, keywords, metadata based contextual data, and name, date, or other notes content contextual terms into the trained machine learning classifier for determination of intent categorization to be assigned to the digitized handwritten notes 410, 412 and 414. The auto-curating contextual engine 466 then stores the intent-categorized digitized handwritten notes 410, 412 and 414 into a corresponding database 435, 437, 439 which may include any number of user intent categories in various embodiments herein. For example, the auto-curating contextual engine 466 may store an action item categorized digitized handwritten note into an action items classification data base 435 (i.e., a to-do list database) in one example embodiment. The auto-curating contextual engine 466 may store an important notes categorized digitized handwritten note into an important notes classification data base 437 in another example embodiment. The auto-curating contextual engine 466 may store other intent-categorized digitized handwritten notes into any number of other intent classification data bases 439 in other example embodiments.

Figure 5:
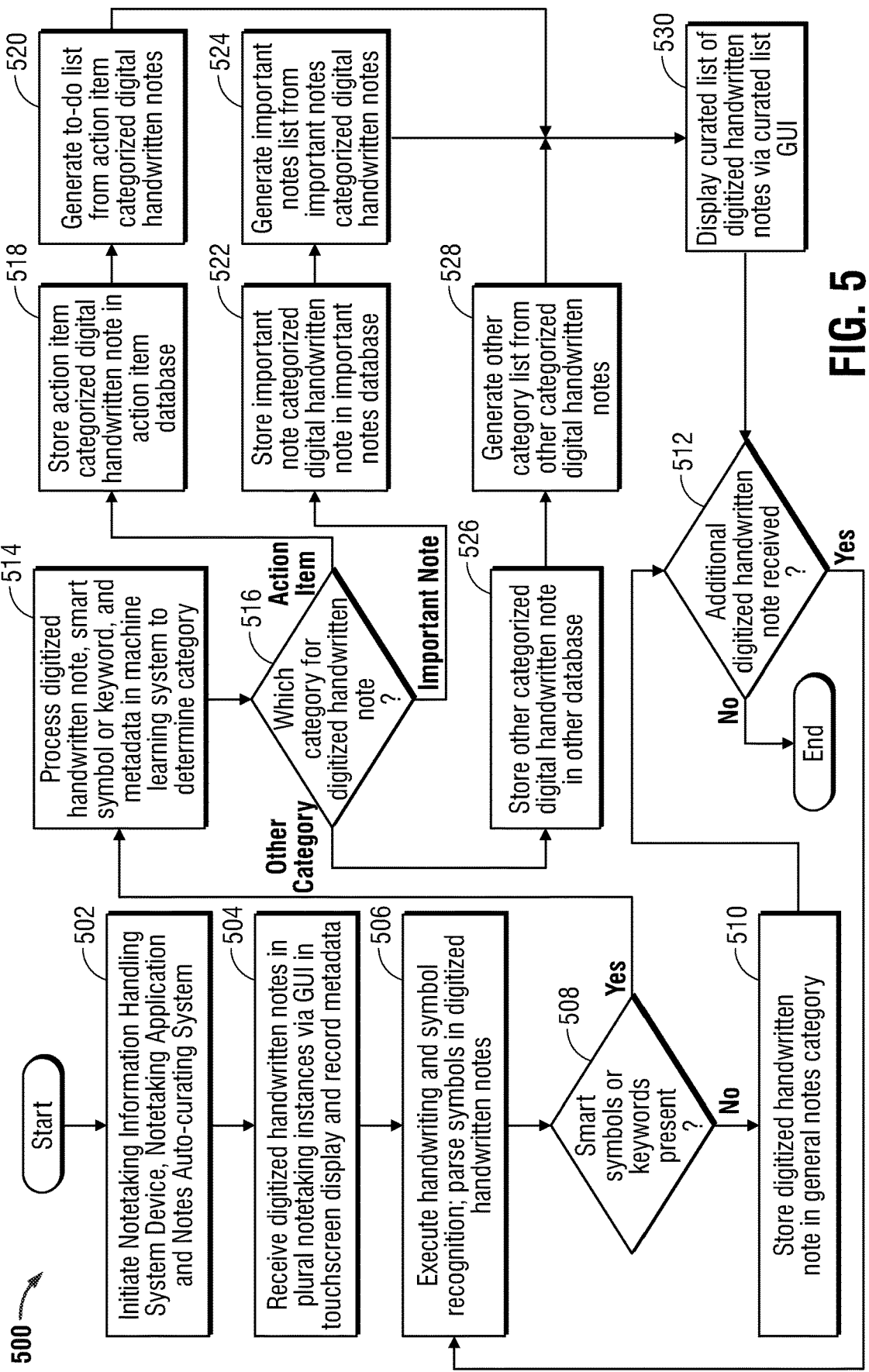
FIG. 5 is a flow diagram of a method of operating a notes auto-curating system on a notetaking information handling system device to auto-curate a list of digitized handwritten notes according to intent-categorizations in an embodiment of the present disclosure.

FIG. 5 is a flow diagram of a method 500 of operating a notetaking information handling system executing code instructions of a notes auto-curating system according to an embodiment of the present disclosure. As described herein, notetaking information handling system may be a tablet-type information handling system or may be any type of information handling system with a touchscreen display for accepting digitized handwritten notes on the display device via a stylus or other I/O device and through a software application, such as a notetaking application, for detecting and storing the digitized handwritten notes in various embodiments. The notetaking information handling system may or may not be operatively coupled to another host information handling system in various embodiments. The notetaking information handling system has a processor, memory, power management unit, and wireless or wired coupling systems for network or other device connectivity. Accordingly, the notetaking information handling system may operate as a standalone notetaking device in some embodiments.

The notes auto-curating system executing on a notetaking information handling system may recognize and parse one or more digitized handwritten notes and process those digitized handwritten notes for determination of smart symbols, keywords, or other contextual information to categorize the digitized handwritten notes into user intent categories. These user intent categories may then be used to generate curated lists of digitized handwritten notes, such as for to-do lists for action items, important note lists for notes designated as having high priority, or other categories or classification lists following a user's intent or based on contextual topic categories within the digitized handwritten notes according to embodiments herein.

The method 500 may include, at block 502, the initiation of the notetaking information handling system and a notetaking application. This initiation may include pressing a power button or awakening the notetaking information handling system from a sleep state. An example notetaking information handling system may be a tablet-type information handling system such as the Dell® Stanza™. This initiation process may include the execution of code instructions by the notetaking device processor of the notetaking application or other content software application that may accept handwritten notes and perform the methods described herein. Additionally, the initiation process may include execution of code instructions for the note auto-curating system according to embodiments herein.

When initiated at block 504, the method of operating the notetaking information handling system includes receiving one or more handwritten notes as digitized handwritten notes at the notetaking application graphical user interface (GUI) via a touchscreen display device according to embodiments herein. A stylus or other I/O device may be used by a user to write on the surface of the touchscreen display of the notetaking information handling system according to embodiments herein. The user may take handwritten notes on the touchscreen display device detects a digitized handwritten note via the touchscreen sensor and location of the stylus across the touchscreen display. This forms a virtual, digitized mark or marks as handwriting on the notetaking application GUI or other software application GUI in an embodiment. Digitized handwritten notes may be broken into notetaking instances which may initially be segregated by time between notetaking events, but may also be sorted by several notes taken during a notetaking event separated into specified notetaking instances. For example, plural digitized handwritten notes may occur in one notetaking event, but upon handwriting and symbol recognition and symbol parsing, delimiters such as punctuation (e.g., periods, colons, bullet points, semicolons), line changes of handwritten text, separate locations of handwritten text, or other factors may act as delimiters to identify notetaking instances for separate, specific digitized handwritten notes taken in a single notetaking event. Several digitized handwritten notes may be received in this way by the notetaking application or other applications and metadata recorded for the notetaking incidents.

The notes auto-curating system according to embodiments herein may track and record metadata for the digitized handwritten notes including labeling the digitized handwritten notes file with metadata for time and date the digitized handwritten note in some embodiments. In further embodiments, additional metadata that may be received from linking the notes auto-curating system to other software applications or determining metadata from detected context of a calendared meeting or event, for content materials being discussed and noted on, or other contextual data relating to the digitized handwritten notes. For example, the notes auto-curating system may link with a calendar application, such as Microsoft Outlook® to determine additional metadata details about the notetaking instance including a title of a meeting being conducted at the date and time, a name or title of a presentation being discussed, names of attendees, a priority allocation or status of the meeting, attendees or presented materials being discussed in some example embodiments.

Proceeding to block 506, the notes auto-curating system may include symbol or handwriting recognition engine to determine and recognize the symbols and handwriting in the received digitized handwritten notes analyzed. The symbol and handwriting recognition engine is used to recognize handwriting as handwriting by the notetaking application for determination of the terms received in the digitized handwritten note images received via the touchscreen display device and, for example, by a stylus. Handwriting text recognition software may be used to recognize the digital handwritten notes as text and symbols. Any symbol or handwriting recognition software system may be used as understood by those of skill and may be executed on the notetaking information handling system, at a remote location such as a host information handling system or a remote server, or some combination.

Upon recognition of the marks as handwriting and containing symbols that may be parsed, the notes auto-curating system executes a symbol parser to determine the one or more symbols within the received, digitized handwritten note or notes in an embodiment. The symbol parser may be used to determine delimited words as well as phrases or partial or full sentences within the notes in some embodiments. The symbol parser may connect symbols within delimited words and words within delimited phrases to determine the content of digitized handwritten notes as digital language notes. The determined digitized handwritten notes may then be used with language recognition software to determine context or meaning of words, partial phrases, or whole phrases within the note content of the digitized handwritten note. The symbol parser may also be used to delimit between plural digitized handwritten notes taken in a single notetaking event in time to distinguish between the plural digitized handwritten notes and provide a notetaking instance for each distinguishable digitized handwritten note in some embodiments. At this point, an auto-curating context engine may compare parsed symbols with a smart symbols library or scan the note content of the parsed digitized handwritten notes for keywords to compare with a keywords library.

At block 508, the notes auto-curating system executing on the notetaking information handling system may utilize the context or meaning determined within each digitized handwritten note associated with a notetaking instance to further determine if any smart symbols or keywords are present within the symbols or words of the note content for the digitized handwritten note in an embodiment. As described, his may be done by comparing the parsed symbols or words with a smart symbols or keywords library. The smart symbols library or keywords library may be learned or compiled from crowdsourced users of notetaking applications or from learned usage from the user of the notetaking application of the notetaking information handling system in various embodiments. In one aspect, generation of a robust smart symbols and keywords library may be established using crowdsourcing from many users of notetaking applications. In a further aspect, a user may set via the notes auto-curating system, in a settings GUI with customized particular smart symbols or keywords that the user may utilize, and which may be added to any existing smart symbols or keywords library. At block 508, if no smart symbols or keywords are detected, then the method may flow to block 510. If smart symbols or keywords are detected in the digitized handwritten note, then flow may proceed to block 514.

At block 510, when no smart symbols or keywords are detected in a digitized handwritten note, then the notes auto-curating system may store the digitized handwritten note of the currently analyzed notetaking instance in a general notes category as a notetaking application would normally store such a digitized handwritten note in an embodiment. In this way, a user may search through her notes as stored to determine the content of those notes manually or via other methods common with notetaking applications. The method will then proceed to block 512 to determine if additional digitized handwritten notes are received to be parsed and scanned for smart symbols or keywords.

At block 514, when at least one smart symbols or at least one keyword is detected in a digitized handwritten note, then the notes auto-curating system may proceed to determine which user-intent category, among a plurality of curating intent categories, that the handwritten note should fall under in an embodiment. An auto-curating contextual engine may be utilized to determine, with a trained machine learning classifier, from among any number of established intent-categories for a user's digitized handwritten note for a given notetaking instance in embodiments. In some example embodiments, a machine learning system is trained and used by the auto-curating contextual engine.

The trained machine learning classifier may be any known or future developed type of machine learning or neural network according to embodiments herein. In particular embodiments, the machine learning could be selected from bootstrap aggregating ("bagging"), Bayes optimal classifier, boosting meta-algorithm, Bayesian model averaging, Bayesian model combination, and stacking generalization, for example. The training of the machine learning system used includes utilizing parsed notes from crowdsourced digitized handwritten notes of users of notetaking applications as delivered to or stored at a central management system accessible by the auto-curating contextual engine in some embodiments. In this way, a large sample of smart symbols and keywords may be inserted into a machine learning classifier to train the auto-curating contextual engine to determine from smart symbols, keywords, or a combination, as well as other contextual data and metadata, categories of a user's intent during a notetaking instance.

In another embodiment, a user of a notetaking information handling system executing the notetaking application and the notes auto-curating system, may train the auto-curating contextual engine with smart symbols and keywords used by that user over time. In this way, a library of keywords or smart symbols may be generated for the auto-curating contextual engine to utilize to determine intent categorizations according to embodiments herein from parsed digitized handwritten notes input into the auto-curating contextual engine. The training of the machine learning classifier may occur at a central management system for management of the notetaking information handling system due to computational requirements, however once trained, a trained machine learning classifier may be executed at the notetaking information handling system in some embodiments.

The notes auto-curating system of the present embodiment may access a keyword dictionary or one or more symbols databases while scanning the note content of a digitized handwritten note, such as via a trained neural network or machine learning classifier as described. One or more common smart symbols and keywords may be identified that correspond to an intent or meaning of importance for handwritten notes. Information for the smart symbol or keyword, as well as contextual information from metadata matching metadata context for particular intent classifications, determination of action sentences, and contextual interpretation of context words in some note content such as name and dates is input to the trained machine learning classifier. The trained machine learning classifier of the auto-curating contextual engine may assign a handwritten note instance to be part of an action items category for curated to-do lists, as part of an important notes category for curated important notes lists, or as part of other user intent categories for a curated other intent category lists in various embodiments. Further categorizations may be yielded from the auto-curating contextual engine. This may include sub-categorizations such as levels of priority determined for a user-intent category such as an important notes category or an action items category. In other embodiments, plural topically-related important notes lists, or action item lists may be sub-categories for form other user intent classifications for other curated lists of digitized handwritten notes. These inputs are put into the trained machine learning classifier to assign an intent categorization (or sub-categorization) to a digitized handwritten note of a particular notetaking instance.

Upon the determination of an intent category for the currently-analyzed digitized handwritten note for a given notetaking instance based on the above at block 516, the notes auto-curating system may proceed to block 518 if the intent category is determined to be an action item in one example embodiment. At block 518, the intent categorized digital handwritten note falling under an action items category may be stored in an action items database in an embodiment. This may be separate database or a particular, designated portion of a single curated list items database. The method may then proceed to block 520.

At block 520, the notes auto-curating system may generate a to-do list from action item categorized digitized handwritten notes. Referring to FIG. 3, the to-do list may include prioritization of one or more action item categorized digitized handwritten notes from plural notetaking instances in an embodiment. For example, the curated to-do list 335 may include plural action item categorized digitized handwritten notes 324, 320, and 322 in the curated to-do list 335 generated at block 520. The curated to-do list may be presented via a curated list GUI 330 as discussed below at block 530. In the shown embodiment of FIG. 3, the curated to-do list 330 include identifying data, such as derived from metadata tagged with each notetaking instance for a digitized handwritten note. For example, a title assigned by a user, if any, to a notetaking instance may be shown as a field entry in the curated to-do list. The curated to-do list 335 may be further prioritized under one or more criteria. In the example embodiment of FIG. 3, the curated to-do list is prioritized via date metadata attached to each digitized handwritten note. In particular, the digitized handwritten notes 324, 320, and 322 are prioritized by recency or reverse chronological order in the shown embodiment of FIG. 3. Other priority criteria may be used including regular chronological order, or assigned importance priority levels based on topic, note titles, attendee names at a notetaking event, names of individuals found in note content, keywords used, smart symbols used, or other contextual or metadata factors. Further, a custom priority 333 may be input by a user using the curated list GUI 330 in some example embodiments. Such custom prioritization is discussed above with regard to FIG. 3. The method proceeds to block 530 for display of the curated to-do list of digitized handwritten notes via the curated list GUI 330 as discussed below.

Returning to block 516, the notes auto-curating system may proceed to block 522 if the user intent category for the digitized handwritten note is determined to be a designated as an important note in another example embodiment. At block 522, the intent categorized for the digital handwritten note falling under an important note prioritization category may be stored in an important notes database in an embodiment. In one embodiment, granulated priority levels determined from smart symbols, keywords, context, or metadata may be distinguished within sublevels of the important note category. For example, plural exclamation points or an exclamation point plus a strong keyword may be deemed a higher importance than a smart symbol star in an example embodiment. Any level of granular sub-category based on priority of important notes may be used and any combination of input factor may determine such sub-categories according to embodiments herein. The important notes category database may be separate database or a particular designated portion of a single curated list items database.

At block 524, the notes auto-curating system may generate an important notes list from important notes categorized digitized handwritten notes as determined from intent to designate importance by a user in the digitized handwritten note. For example, the curated important notes list may include plural intent categorized digitized handwritten notes in the curated important notes list generated at block 524. Similar to the curated to-do list in FIG. 3, the important notes list may include prioritization of one or more attributed important note categorizations for the digitized handwritten notes from plural notetaking instances in an embodiment. The curated important notes list may be presented via a curated list GUI as discussed below at block 530.

In one embodiment, the curated important notes list includes identifying data, such as derived from metadata tagged with each notetaking instance for a digitized handwritten note. For example, a title assigned by a user, if any, to a notetaking instance may be shown as an entry field in the curated important notes list. Further, the date or time of the digitized handwritten notes from metadata may be listed in the curated important notes list. In yet another embodiment, the curated important notes list may be further prioritized under one or more criteria. In example embodiments, the curated important notes list may be prioritized via date metadata in reverse chronological order or in chronological order in one embodiment. Other priority criteria may be used including assigned importance priority levels based on topic, note titles, attendee names at a notetaking event, names of individuals found in note content, keywords used, smart symbols used, or other contextual or metadata factors. Further, a custom priority may be input by a user using the curated list GUI in some example embodiments. Such custom prioritization is discussed above regarding FIG. 3. The method then proceeds to block 530 for display of the curated important notes list of digitized handwritten notes via the curated list GUI as discussed below.

The notes auto-curating system may proceed to block 526 if the intent category is determined to be a designation by the user to some other designated user intent category in yet another example embodiment. Any other designated intent category may be used, and the intent category may be topical, relate to a particular project name or title, relate to individual's names, or fall within granulated priority levels of note importance designations or priority levels for action items in various embodiments. For example, other designated intent categories may include notes relating to particular projects or project topics, relating to meetings with particular individuals having a known hierarchy of importance for a user, or relating to intent to store bibliographic data, biographical data, or other data types.

At block 528, the notes auto-curating system may generate an other intent-category curated list from some other user intent categorization determined for digitized handwritten notes. This other user intent category curated list may include one or more other user intent categorized digitized handwritten notes from plural notetaking instances in an embodiment. For example, the curated other category curated list may include plural other-categorized digitized handwritten notes generated at block 528. The curated other-categorized list is presented via a curated list GUI as discussed below at block 530. As with other embodiments of curated lists, the curated other-categorized list includes identifying data, such as derived from metadata tagged with each notetaking instance, for each digitized handwritten note in the curated other-categorized list. For example, a title assigned by a user, if any, is shown as a field entry in the curated other-categorized list.

The curated other-categorized list is further prioritized under one or more criteria. Further, the date or time of the digitized handwritten notes from metadata is listed in the curated important notes list. In yet another embodiment, the curated important notes list is further prioritized under one or more criteria. In example embodiments, the curated important notes list is prioritized via date metadata in reverse chronological order or in chronological order in one embodiment. Other priority criteria may be used including assigned importance priority levels based on topic, note titles, attendee names at a notetaking event, names of individuals found in note content, keywords used, smart symbols used, or other contextual or metadata factors. Further, a custom priority may be input by a user using the curated list GUI in some example embodiments. Such custom prioritization is discussed above with regard to FIG. 3. The method then proceeds to block 530 for display of the curated important notes list of digitized handwritten notes via the curated list GUI as discussed below.

At block 530, the notes auto-curating system executing on the notetaking information handling system displays a curated list GUI where a user may select and access one or more curated lists in an embodiment. For example, the user may select a to-do list to display a generated to-do list for the user in the curated list GUI in an embodiment. The user may select an important notes list to display a generated important notes curated list for the user in the curated list GUI in another embodiment. In yet another embodiment, the user may select another type of curated list to display a generated other category curated list of digitized handwritten notes. In this way, the notes auto-curating system executing on the notetaking information handling system tracks what may be a plethora of handwritten notes and may provide easy access, with identifying metadata as well, to find digitized handwritten notes that fell within an action item category, important note designation category, or another user-intent category as available to the user of the notes auto-curating system in various embodiments.

In a further aspect at 530, the curated lists available for presentation in the curated list GUI may be filtered with a search system if there should still be a large number of digitized handwritten notes within the intent categories in some embodiments. For example, the user may select a range of dates or event times on a given date to review a curate list within a specified time or date window in an embodiment. In another example embodiment, other metadata associated with the digitized handwritten notes may be used to filter the curated lists presented via the curated list GUI. For example, the curated lists may be filtered in some embodiments based on title of event or meeting, or by a topic name of an event, meeting, or presentation materials during the notetaking instances for a digitized handwritten notes in one embodiment. Referring to FIG. 3, a custom priority interface 333 may be used to select from a plurality of available filters or entry of a search term to filter the displayed curated list of digitized handwritten notes. The curated lists may be filtered based on names of attendees to an event or meeting during notetaking instances for a digitized handwritten notes in one embodiment in another embodiment. For example, all curated lists for meeting with a boss, customer, or team may filter the curated lists presented via the curated list GUI. Other filtering is contemplated as well with respect to the curated lists at block 530 according to any metadata or contextual note content data associated with notetaking instances for digitized handwritten notes in various embodiments. After one or more curated lists is displayed or selected for display by the user, the method will then proceed to block 512 to determine if additional digitized handwritten notes are received and to be parsed and scanned for smart symbols or keywords.

Returning to block 512, the notes auto-curating system executing on the notetaking information handling system may continue to monitor for additional received digitized handwritten notes via the notetaking application and the touchscreen display until the notes auto-curating system, the notetaking application, or the notetaking information handling system are shut down in some embodiments. In any of these embodiments, when no additional digitized handwritten notes are received, the method may end. If additional digitized handwritten notes are received, the method may return to block 506 for the notes auto-curating system executing on the notetaking information handling system to execute handwriting and symbol recognition as well as symbol parsing as before and proceed with execution of the notes auto-curating system according to the method of FIG. 5.

The blocks of the flow diagram of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A notetaking information handling system device comprising:
   a processor, a memory device, and a power management unit;
   a touchscreen display device displaying a graphical user interface (GUI) of a software application and receiving a digitized handwritten note in a first notetaking instance;
   the processor to record metadata relating to the first notetaking instance, where the metadata includes date, time, and meeting details in the first notetaking instance;
   the processor executing code instructions of a notes auto-curating system to perform symbol and handwriting recognition to identify detected note content context words to compare content context words with a keyword library;
   the processor to conduct symbol scanning to parse symbols in the digitized handwritten note and compare symbols in the handwritten note with a smart symbol library;
   the processor executing code instructions of an auto-curating contextual engine of the notes auto-curating system to:
      determine from the digitized handwritten note, that a smart symbol; and a keyword are within the note content of the digitized handwritten note;
      process the digitized handwritten note, including the smart symbol and the keyword found, with the metadata for the first notetaking instance into a trained machine learning system to correlate the digitized handwritten note having the smart symbol and keyword between an important notes category, and an action items category for storage at a corresponding classification database operatively coupled to the notes auto-curating system; and
      generate a curated to-do list with the digitized handwritten note when the digitized handwritten note falls into the action items category, where the curated to-do list includes dates or title of the first notetaking instance and the curated to-do list including at least additional other action item digitized handwritten notes falling into the action items category; and
   the display device displaying a GUI including the generated curated to-do list that is separated from a plurality of other received, digitized handwritten notes received at the display device that do not fall into the action items category.

2. The notetaking information handling system device of claim 1 further comprising:
   the software application for accepting digitized handwritten notes is a notetaking application.

3. The notetaking information handling system device of claim 1 further comprising:
   the software application for accepting digitized handwritten notes is a content presentation application that also receives handwritten notes detected via the touchscreen sensor.

4. The notetaking information handling system device of claim 1 further comprising:
   the metadata relating to the first notetaking instance includes a date for the first notetaking instance.

5. The notetaking information handling system device of claim 1 further comprising:
   the metadata relating to the first notetaking instance includes a meeting or event name for the first notetaking instance.

6. The notetaking information handling system device of claim 1 further comprising:
   the metadata relating to the first notetaking instance includes a participant names for the first notetaking instance.

7. The notetaking information handling system device of claim 1 further comprising:
   the auto-curating contextual engine of the notes auto-curating system accessing the trained machine learning system to correlate the digitized handwritten note with the important notes category or the action items category, where the trained machine learning system is a machine learning classifier trained with crowd-sourced digitized handwritten notes from a plurality of notetaking instances at a plurality of notetaking applications.

8. The notetaking information handling system device of claim 1 wherein the combination of smart symbol and keyword within the note content determines that a received digitized note falls into the important notes category, and the processor generates a curated important notes list with the digitized handwritten note when it falls into the important notes category that includes additional digitized handwritten notes falling under the important notes category.

9. The notetaking information handling system device of claim 1 further comprising:
the processor filters the curated to-do list with the digitized handwritten note when it falls into the action items category that is limited to a range of values for the metadata relating to a range of dates or limited to similarly-titled notetaking instances associated with the additional digitized handwritten notes in the plural other notetaking instances for the action items category.

10. A notetaking information handling system device comprising:
a processor, a memory device, and a power management unit;
a touchscreen display device displaying a graphical user interface (GUI) of a software application for accepting digitized handwritten notes and receiving a plurality of digitized handwritten notes in a plurality of notetaking instances, including a first notetaking instance and a second notetaking instance;
the processor to record first metadata relating to the first notetaking instance and second metadata relating to the second notetaking instance, where the first metadata includes date, time, and participants in the first notetaking instance and the second metadata includes date, time, and meeting details in the second notetaking instance;
the processor executing code instructions of a notes auto-curating system to perform symbol and handwriting recognition to identify detected note content context words in the first note taking instance and the second notetaking instance to compare content context words with a keyword library;
the processor executing code instructions to conduct symbol parsing on a first digitized handwritten note in the first notetaking instance and on a second digitized handwritten note in the second notetaking instance to compare symbols in the handwritten note with a smart symbol library;
the processor executing code instructions of an auto-curating contextual engine of the notes auto-curating system to:
determine from the first digitized handwritten note, a first smart symbol within the note content of the first digitized handwritten note;
process the first digitized handwritten note with the first smart symbol and the first metadata for the first notetaking instance into a trained machine learning classifier to correlate the first digitized handwritten note to select between an important notes category in an important notes database operatively coupled to the notes auto-curating system and an action items category in an action items database operatively coupled to the notes auto-curating system;
determine from the second digitized handwritten note, a second smart symbol within the note content of the first digitized handwritten note;
process the second digitized handwritten note with the second smart symbol and the second metadata for the second notetaking instance in the trained machine learning system to correlate the second digitized handwritten note to select between the important notes category in an important notes database operatively coupled to the notes auto-curating system and the action items category in the action items database operatively coupled to the notes auto-curating system;
generate a curated important notes list with the first digitized handwritten note and generate a curated to-do list with the second digitized handwritten note; and
the display device displaying a curated list GUI for the user to access the curated important notes list and the curated to-do list separated from a plurality of other received, digitized handwritten notes received at the touchscreen display device.

11. The notetaking information handling system device of claim 10 further comprising:
the processor filters the curated important notes list with the first digitized handwritten note by limiting the curated important notes list to the metadata relating to similar-titles for plural other notetaking instances associated with a plurality of additional digitized handwritten notes falling within the important notes category.

12. The notetaking information handling system device of claim 10 further comprising:
the processor filters the to-do notes list with the second digitized handwritten note when that is limited to a range of values for the metadata relating to a range of dates for plural other notetaking instances associated with a plurality of additional digitized handwritten notes falling within the action items category.

13. The notetaking information handling system device of claim 10 further comprising:
the auto-curating contextual engine of the notes auto-curating system accessing the trained machine learning system to correlate the digitized handwritten note with the important notes category or the action items category, where the trained machine learning system is a machine learning classifier trained with crowd-sourced digitized handwritten notes from a plurality of notetaking instances at a plurality of notetaking applications.

14. The notetaking information handling system device of claim 10, wherein a combination of the smart symbol and a parsed keyword within the note content determines that a first or second digitized handwritten note falls into the important notes category or the action items category.

15. The notetaking information handling system device of claim 10 further comprising:
the GUI of a software application for accepting digitized handwritten notes to receive a designation from a user of a symbol as a customized smart symbol for an action item category.

16. The notetaking information handling system device of claim 10, wherein the action items database and the important notes database are filterable by parameters including dates of notetaking instances, title topics of notetaking instances, or persons attending an event with notetaking instances.

17. A method of executing code instructions of a notes auto-curating system to curate digitized handwritten notes comprising:

displaying a graphical user interface (GUI) via a touchscreen display device a software application for accepting digitized handwritten notes;

receiving a plurality of digitized handwritten notes in a plurality of notetaking instances, including a first notetaking instance and a second notetaking instance;

recording, via a processor, first metadata relating to the first notetaking instance and second metadata relating to the second notetaking instance, where the first metadata includes date, time, and participants in the first notetaking instance and the second metadata includes date time, and meeting details in the second notetaking instance;

executing code instructions of the notes auto-curating system, via a processor, to perform symbol and handwriting recognition to identify detected note content context words in the first note taking instance and the second notetaking instance to compare content context words with a keyword library;

executing code instructions of the notes auto curating system to conduct symbol parsing on a first digitized handwritten note in the first notetaking instance and a second digitized handwritten note in the second notetaking instance to compare symbols in the handwritten note with a smart symbol library;

executing code instructions of an auto-curating contextual engine of the notes auto-curating system to determine from the first digitized handwritten note, a first smart symbol within the note content of the first digitized handwritten note and process the first digitized handwritten note with the first smart symbol and the first metadata for the first notetaking instance into a trained machine learning system to correlate the first digitized handwritten note between an action items category in an action items database operatively coupled to the notes auto-curating system and an important notes category in a notes data base operatively coupled to the notes auto-curating system;

generating a curated to-do list including the first digitized handwritten note and including additional action item categorized digitized handwritten notes that fall within the action items category when the first digitized handwritten note in the file networking instance is correlated to the action items category; and displaying a GUI for the user to access the curated to-do list separated from a plurality of other received, digitized handwritten notes received at the display device.

18. The method of claim 17 further comprising:

executing code instructions of the auto-curating contextual engine to determine from the second digitized handwritten note, the first smart symbol within the note content of the second digitized handwritten note;

the auto-curating contextual engine to process the second digitized handwritten note with the first smart symbol and the second metadata for the second notetaking instance into the trained machine learning system to correlate the second digitized handwritten note between the action items category in the action items database operatively coupled to the notes auto-curating system and an important notes category in an important notes data base operatively coupled to the notes auto-curating system; and generating addition to the curated to-do list including the second digitized handwritten note when the second digitized handwritten note in the second notetaking instance is correlated to the action items category.

19. The method of claim 17 further comprising:

executing code instructions of the auto-curating contextual engine to determine from the second digitized handwritten note, a second smart symbol within the note content of the second digitized handwritten note;

the auto-curating contextual engine to process the second digitized handwritten note with the second smart symbol and the second metadata for the second notetaking instance into the trained machine learning system to correlate the second digitized handwritten note with the important notes category in the important notes database operatively coupled to the notes auto-curating system; and generating an important notes list including the second digitized handwritten note and including other additional digitized handwritten notes that fall within the important notes category; and displaying the curated important notes list separated from a plurality of other received, digitized handwritten notes including the first digitized handwritten note received at the display device.

20. The method of claim 17, wherein a combination of the first smart symbol and a parsed keyword within note content determines that the first digitized handwritten note or the second digitized handwritten note falls into the important notes category or the action items category.

* * * * *